(12) United States Patent
Knipfer et al.

(10) Patent No.: US 7,937,176 B2
(45) Date of Patent: May 3, 2011

(54) HYBRID PART INSTALLATION PROCESS COMBINING MASS PART INSTALLATION TECHNIQUES WITH DISCRETE PART NUMBER ASSEMBLY ACTIVITIES

(75) Inventors: Ivory Wellman Knipfer, Rochester, MN (US); Jason Scott Lee, Oronoco, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 12/271,456

(22) Filed: Nov. 14, 2008

(65) Prior Publication Data

US 2010/0125354 A1    May 20, 2010

(51) Int. Cl.
*G06F 19/00* (2006.01)
*G06F 7/00* (2006.01)

(52) U.S. Cl. .......... 700/99; 700/105; 700/106; 700/216; 700/222

(58) Field of Classification Search .......... 700/95, 700/97, 99–103, 105, 106, 213, 214, 216, 700/219–222; 705/7, 8
See application file for complete search history.

(56) References Cited

U.S. PATENT DOCUMENTS

| | | | | |
|---|---|---|---|---|
| 4,591,983 | A * | 5/1986 | Bennett et al. | 706/53 |
| 4,894,908 | A * | 1/1990 | Haba et al. | 29/711 |
| 5,600,565 | A * | 2/1997 | Wagner et al. | 700/219 |
| 5,781,443 | A * | 7/1998 | Street et al. | 700/214 |
| 6,381,509 | B1 | 4/2002 | Thiel et al. | |
| 6,779,726 | B1 * | 8/2004 | Easton | 235/462.01 |
| 6,820,038 | B1 * | 11/2004 | Wetzer et al. | 702/184 |
| 7,054,704 | B2 | 5/2006 | Bickley et al. | |
| 7,062,893 | B2 | 6/2006 | Lawton et al. | |
| 7,077,318 | B2 * | 7/2006 | Venema et al. | 235/462.01 |
| 7,110,842 | B2 | 9/2006 | Angelo | |
| 7,292,988 | B2 * | 11/2007 | Jackson et al. | 705/8 |
| 7,610,112 | B2 * | 10/2009 | Knipfer et al. | 700/106 |
| 7,766,242 | B2 * | 8/2010 | Lunak et al. | 235/462.45 |

(Continued)

FOREIGN PATENT DOCUMENTS

JP     2004186380 A  *  7/2004

OTHER PUBLICATIONS

U.S. Appl. No. 11/961,594, filed Dec. 20, 2007, Hurtis et al.

(Continued)

*Primary Examiner* — Crystal J Barnes-Bullock
(74) *Attorney, Agent, or Firm* — Yee & Associates, P.C.; Steven L. Bennett

(57) ABSTRACT

A hybrid data collection and component installation scheme for optimizing equipment cost, throughput, and quality practices in a multi-stage manufacturing environment. A kit comprising a plurality of parts corresponding to an order for a product is received from one of the stages in the multi-stage manufacturing environment. The parts in the kit were validated in the stage using data collected about the plurality of parts in the stage. At a subsequent stage in the manufacturing environment, a determination is made if the product qualifies for mass installation. If the product qualifies for mass installation, a set of parts in the kit is selected for mass installation. The set of parts are re-verified using the data collected in the previous stage in the environment to determine if the set of parts selected for mass installation is valid. If valid, the set of parts are installed en masse.

20 Claims, 4 Drawing Sheets

U.S. PATENT DOCUMENTS

| | | | |
|---|---|---|---|
| 2006/0190111 A1* | 8/2006 | Beniz et al. | 700/97 |
| 2007/0129847 A1 | 6/2007 | Ulmer et al. | |
| 2007/0233300 A1 | 10/2007 | Jones | |
| 2008/0071603 A1 | 3/2008 | Denton et al. | |
| 2008/0103622 A1 | 5/2008 | Hanses et al. | |
| 2010/0044350 A1* | 2/2010 | Heiml et al. | 219/121.14 |

OTHER PUBLICATIONS

U.S. Appl. No. 11/876,487, filed Oct. 22, 2007, Knipfer et al.

Joshi et al., "Use of Simulation to Improve the Kitting Process at an EMS Provider's Facility", IEEE, 2002, Electronic Packaging Technology Conference, pp. 440-445.

Beccari et al., "A Real-Time Library for the Design of Hybrid Robot Control Architecture", Proceedings of the 1998 IEEE Intl. Conference on Intelligent Robots and Systems, pp. 1145-1150.

Onori et al., "MKIII Flexible Automatic Assembly System: A Stepwise Upgradeable Solution for Multiple Products and Unpredictable Order Schemes", 26th International Symposium on Industrial Robots, pp. 235-240.

Spath et al., "Synchronization of Material Flow and Assembly in Hybrid and Modular Systems", Assembly Automation, 2001, vol. 21, Issue 2, pp. 152-157.

Saad, "Design and Analysis of a Flexible Hybrid Assembly System", Jun. 1994, PhD, thesis submitted to the University of Nottingham Department of Manufacturing Engineering and Operations Management, Nottingham England, pp. 1-249.

Csakvary et al., "Production Selection Procedure for Programmable Automatic Assembly Technique", Proceedings of the 2nd International Conference on Assembly Automation, Brighton, UK, May 1981, pp. 201-210.

\* cited by examiner

| | 602 | 604 | 606 | 608 | 610 | 612 | 614 |
|---|---|---|---|---|---|---|---|
| | BOM | PN | COMMODITY CODE | OPERATION | PLACEMENT INDICATORS | ASSET CLASS | DESCRIPTION |
| 616 | *ALL | *ALL | DASD | 0050 | LIKE "DS0"+% | | THESE PARTS MUST ENSURE WHICH SN GOES IN WHICH DISK SLOT FOR TEST AND VERIFICATION |
| 618 | *ALL | 334FF29 | *ALL | *ALL | *ANY | | THIS PART ALWAYS REQUIRES SPECIAL HANDLING AS IT HAS VERY TRICKY INSTALLATION PROCEDURES |
| 620 | *ALL | *ALL | *ALL | *ALL | *ALL | APC5 | ALL HIGHLY CONFIDENTIAL ASSETS REQUIRE SPECIAL HANDLING AND GUARANTEED USER ACKNOWLEDGEMENT OF HOW THIS PART IS BEING INSTALLED |

FIG. 6

HYBRID PART INSTALLATION PROCESS COMBINING MASS PART INSTALLATION TECHNIQUES WITH DISCRETE PART NUMBER ASSEMBLY ACTIVITIES

BACKGROUND OF THE INVENTION

1. Field of the Invention

The present invention relates generally to an improved manufacturing system, and in particular to a manufacturing system comprising a hybrid data collection and component installation scheme that allows for optimizing equipment cost, throughput, and quality practices in a multi-step manufacturing facility.

2. Description of the Related Art

In a manufacturing environment, a requisition for goods or services, described in terms of exchange of those goods or services for agreed compensation in a contractual form, is called an order. Customers place orders for products that must be manufactured once the order has been placed. For timely manufacturing and delivery of the ordered product, a significant amount of planning, preparation, and procurement procedures are involved in the production process. Accounting systems, planning systems, warehouse management systems, logistics systems, and numerous other systems, support the production planning process to ensure that the orders are capable of being fulfilled. These systems may determine whether orders can be fulfilled based on the buyer's account status, suppliers' inventory levels, manufacturer's own warehouse inventory, quantities on hand, assembly schedule availability, and tooling and personnel availability among other factors.

When an order is received from a customer, the manufacturing system breaks down the order into requisite materials. The term "material" used in the context of an order in this manner means the various components, supplies, accessories, and consumable items needed for making the ordered product. For example, for an order for a computer, the materials may include a specific motherboard, a processor of a certain specification, a chassis of certain dimensions, a power supply of certain wattage, and number of screws of a certain size to fasten the motherboard to the chassis. For each order, the manufacturing system may generate one or more bills of materials (BOM), which is a listing of materials or parts needed to complete the order. A part is an individual component or device which exists prior to being assembled into another component or assembly.

A manufacturing process often comprises multiple steps or stages. In a manufacturing environment, these multiple stages may include material preparation (kitting), assembly or material processing (including machining or chemical processes), testing, and shipping, among others. When a customer order for a product is received in the manufacturing system, the parts required to fulfill the order are located by the kitting processes. Kitting is the process of organizing separate components or parts in a materials area into a group of parts for assembly based on a production order. Operators in the kitting area pull the parts needed to assemble the ordered product from a materials area and place these parts into a kit. The kitted parts are sent in a tote or bin to the assembly area, and the operators in the assembly area take the parts from the kit and assemble the parts to build the product. The assembly processes may also comprise multiple steps in which the assembled products are then used to build a larger product. After the assembly processes are performed, testing may be performed on the assembled product. The tested product is then prepared for shipping to the requesting customer.

Within the production environment, data is often collected about the parts used to build a product. This collected data is used to verify that only parts determined to be valid are actually used in the assembly process, as well as to track the location in which the parts are installed in the assembled product. Parts may be validated to enforce the quality of the product in spite of changes from the original production order, such as, for example, engineering changes which require that a part specified in an original bill of materials for a product is to be replaced with a substitute part for future manufacturing, or quality stop holds which prevent a part from being used in the manufacturing process for a period of time. To collect data about the parts for the build, an operator may scan the bar code/serial number on each part when the operator handles the parts, such as when the operator kits the parts in the kitting area or installs the part into the product in the assembly area. Examples of collected data may include, but are not limited to, a part number or part identification, an engineering change level or revision number, a unique sequence number, a lot number, batch ID, date code, time of manufacture, manufacturer of the component, manufacturing/processing location, an assembly ID or tracking number, a unique unit of work identifier for assemblies, and many forms of assembly or part secondary data such as MAC IDs for computer Network Interface Devices (NICs) and other such universal unique IDs, etc. The collected data may be used to verify that each part placed within the bin during the kitting processes or that each part used during the assembly process is a valid part that may be properly used in completing the production order.

BRIEF SUMMARY OF THE INVENTION

The illustrative embodiments provide a hybrid data collection and component installation scheme that allows for optimizing equipment cost, throughput, and quality practices in a multi-stage manufacturing environment. The illustrative embodiments receive a kit comprising a plurality of parts corresponding to an order for a product from one of the stages in the multiple stage manufacturing environment. The parts in the kit were validated in the stage using data collected about the plurality of parts in the stage. At a subsequent stage in the multiple stage manufacturing environment, a determination is made if the product qualifies for mass installation. If the product qualifies for mass installation, a set of parts in the kit that corresponds to the product is selected for mass installation. The set of parts are re-verified using the data that was collected in the previous stage in the multiple stage manufacturing environment to determine if the set of parts selected for mass installation is valid. Responsive to a determination that the set of parts is valid for mass installation, the set of parts are installed en masse.

BRIEF DESCRIPTION OF THE SEVERAL VIEWS OF THE DRAWINGS

FIG. 5 is an exemplary mass installation rules table indicating products available for mass installation in accordance with the illustrative embodiments; and FIG. 6 is an exemplary mass installation rules special handling table indicating parts excluded from the mass installation processes in accordance with the illustrative embodiments.

DETAILED DESCRIPTION OF THE INVENTION

Figure 1:
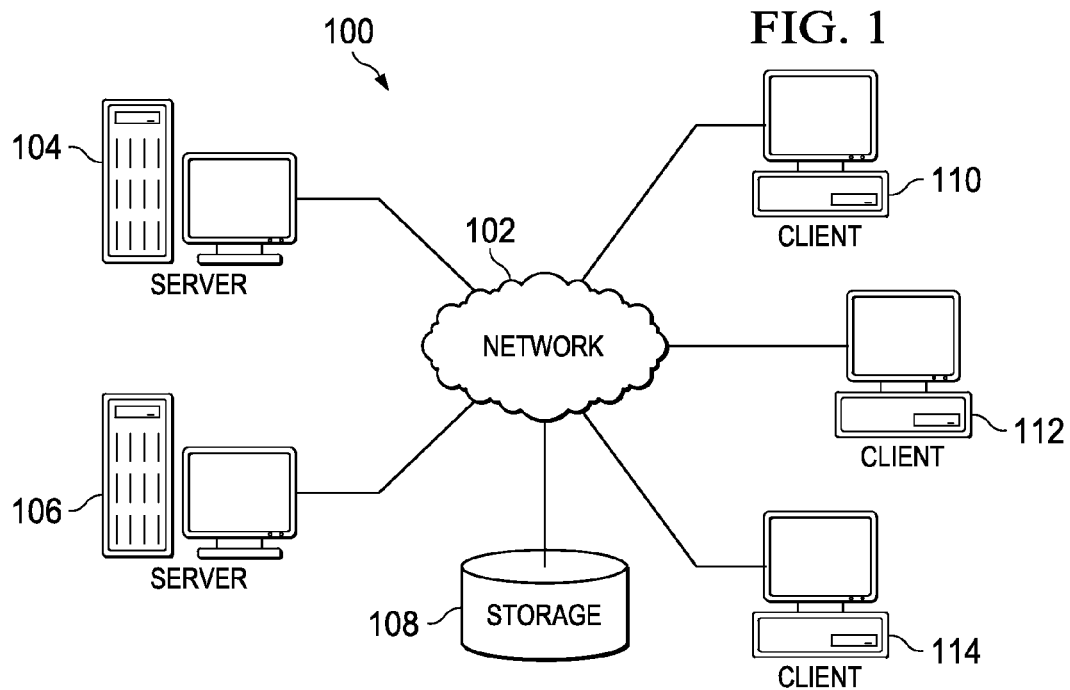
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
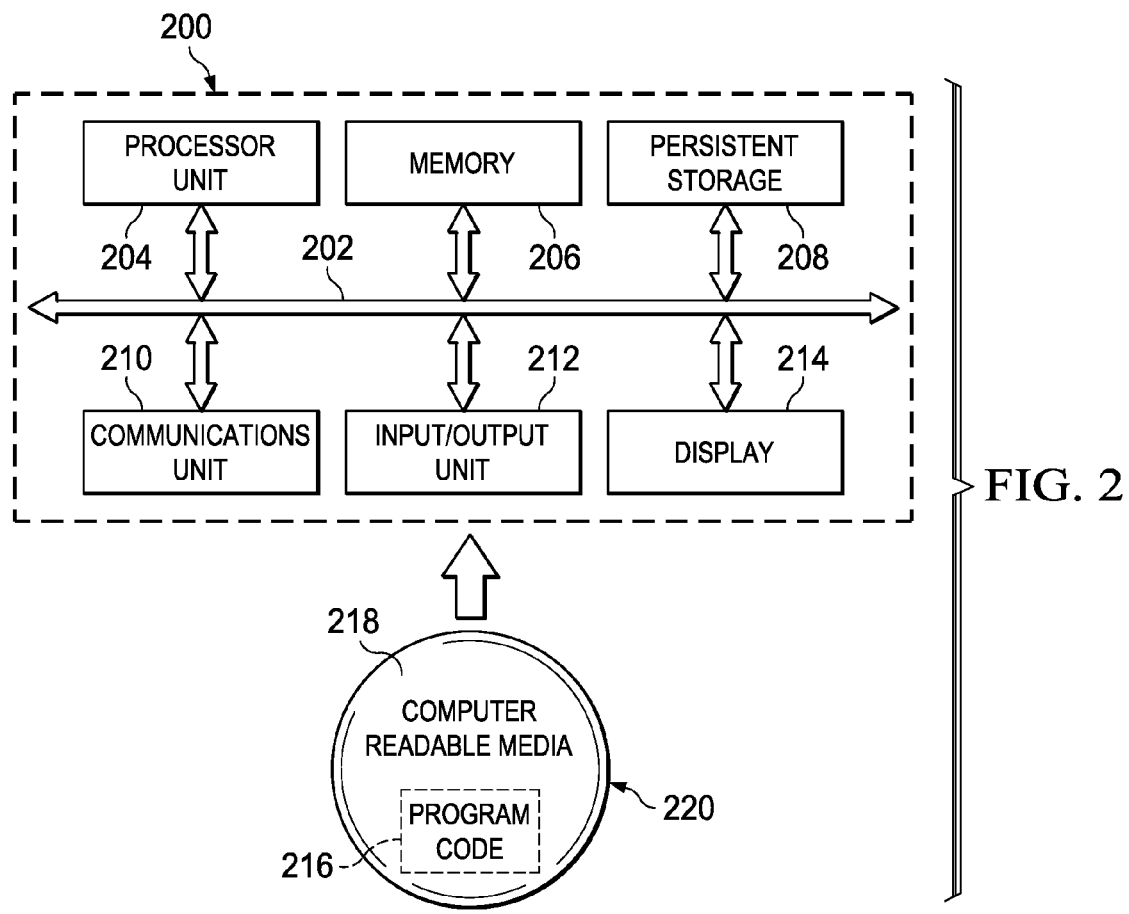
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In existing data collection processes in multiple stage manufacturing environments, various methods and levels of data collection are performed in both the amount of data collected and the number of times the data may be collected (i.e., at which stages) in the environment. Several factors that impact and drive the method and level of data collection that is performed during the production process include work force skill, profit margin, quality issues, and product configuration complexity. Work force skill indicates the skill level of the operators performing the production activities, while profit margin indicates how much money is made by building a product and affects how much data may be collected. These factors may be diametrically opposed to each other with regard to how much data can be collected about the product being made and where the collection can actually take place. For example, if the work force comprises operators with lower skill levels, the processes may need to be broken down into simpler operations, thereby affecting how and where the data is collected. Consider an assembly process in which operators build computers from parts. A highly skilled operator may be able to build the machine from start to finish, whereas lower skilled operators may require the assembly process to be broken up into smaller tasks wherein one operator is trained and qualified to perform one or more tasks, while another operator is trained and qualified to perform another task, and so on in an assembly line process until the product is built. A higher profit margin level allows for purchasing equipment as needed for data collection. However, a lower profit margin level limits the amount of equipment for performing data collection, as well as the time allotted for data collection processes. Thus, a lower profit margin level would drive a lower level of data collection, a work force with lower skilled worked would drive a higher level of data collection. The work force skill and profit margin levels may also constrain the amount of data that can be collected to satisfy quality issues and product configuration complexity. The quality of a product is typically reflected in the amount of data that is collected during the production process. Collecting more data about the product often results in fewer quality issues, while collecting less data often results in higher levels of re-verification of the parts in the assembled product. If more data is collected about the product, the quality of the product will be higher as it is easier to detect and locate part defects prior to these parts being kitted or installed into the product. However, profit margins and available capacity (required cycle times) may dictate the amount of data that can be collected, thereby potentially contributing to quality issues in the assembled products. The complexity of the product configuration affects how much data should be collected about the product. As the complexity level of a product increases, the more data needs to be collected to facilitate adequate quality control.

Existing multiple stage manufacturing processes contain some level of inefficiency in the way data is collected or in the cycle time of manufacturing the product. When kitting processes and assembly processes are included in a workflow for example, any existing data collection scheme sub-optimizes equipment cost, cycle time (throughput) or product quality practices, and any multi-step process involving repetitive data collection results in the same sub-optimization. Equipment costs comprise expenses required to purchase equipment needed for data collection processes. Cycle time comprises the amount of time it takes to kit and build the completed product. Product quality reflects how often incorrect or invalid parts are inadvertently used in the kitting or assembly processes.

There are four main solutions in the existing art for handling data collected about parts in a multiple stage manufacturing process. Each solution comprises a combination of kitting and assembly processes that produce some inefficiency in equipment cost, cycle time, and/or product quality practices. One solution comprises pre-kitting and scanning the parts during the kitting process, and then assembling the product from the parts without performing a scan of the parts during the assembly process. Data may be collected at the kitting area by scanning the bar code or collecting the required data from the part in another manner as each part is placed into the kit. As the parts are scanned only once at the kitting area, this solution provides the fastest throughput or cycle time (i.e., total time required to manufacture the product) and reduces the amount of data collection equipment, since no data collection equipment is required in the assembly area. However, there is a high potential for quality issues to arise when implementing this solution because parts that are incorrect or invalid for the product assembly are not detected. For example, by not collecting data during the assembly process in which the parts in the kit are installed, an engineering change or quality stop hold that was issued on a particular part between the time the part was scanned at the kitting area and the time the part is being assembled at the assembly area may be missed, resulting in a defective product. While this solution provides the fastest cycle time for manufacturing a product, this solution may produce a high number of defects since no data is collected about the parts during assembly, and there is no way to know exactly which parts have been installed and exactly where (i.e., which slots) these parts were installed in the product.

The second solution comprises pre-kitting the parts without performing a scan of the parts during the kitting process, and assembling and scanning the parts only during the assembly process. Data may be collected at the assembly area by scanning the bar code/serial number on the part as each part is installed into the product assembly. As the parts are scanned only at the assembly area, this solution reduces the amount of data collection equipment needed, since no data collection equipment is required in the kitting area. Collecting data about the parts during the assembly process allows for containing incorrect parts for the product assembly prior to the parts actually being installed into the assembly. However, this solution introduces more throughput problems than the first solution, because this solution can inject many containment issues (i.e., unknowingly sending bad/incorrect parts to the assembly area as it is not known which parts have actually been kitted) that may only be found during the assembly process when data about the parts is collected for the first time. Thus, while the quality of the product assembly is sufficient in that the parts that are defective or not usable are identified and contained at the assembly area and the data collected at the assembly area reflects which parts are being installed and the location (e.g., slot) of the installation, this solution is still inefficient because problems created in the kitting area are allowed to move down the assembly line and will be found late in the manufacturing process. If a problem is found during the assembly process, the process must return to the kitting operators and request the correct part in order to continue the assembly process, which consequently negatively affects the cycle time for the product build.

The third solution comprises pre-kitting and scanning the parts during the kitting process, and then assembling and scanning the parts during the assembly process. This solution has the highest quality control since parts are verified at both locations to find and remove bad or incorrect parts. However, this solution has the highest equipment costs since scanning equipment is required at both the kitting area and assembly area. This solution also takes the longest amount of time to implement and is the most inefficient solution to use in terms of cycle time.

The fourth solution comprises removing the kitting process entirely, directly pulling the parts from a line-side stocking location, and scanning the parts at the assembly area. This solution requires a full set of equipment at the build area and eliminates pre-kit activities. However, this solution is inefficient in a similar manner as the second solution as containment issues created by this solution have a negative impact on the throughput/cycle time of the assembled product. Thus, existing data collection techniques all produce some level of inefficiency in equipment cost, throughput, and quality practices when implemented in a multiple stage manufacturing environment.

The illustrative embodiments provide a solution to the problems above by providing a mechanism that improves the efficiency of data collection in multiple stage manufacturing processes by providing a hybrid data collection and component installation scheme that adjusts the manufacturing process to optimize equipment cost, throughput, and quality practices in a multiple stage manufacturing facility, such as kitting-assembly. The hybrid data collection and component installation scheme comprises the ability to install/assemble selective parts en masse in the product assembly process, as well as automatically validate these parts during installation. User-defined parameters define when the mass installation process is available for a set of parts and specific situations or exceptions in which the mass installation process is not deemed appropriate and require "special handling". The assembly process uses these user-defined parameters to automatically determine what type of component installation should be performed by the assembly process, and thus the level of data collection that should be performed. For example, in kitting-assembly processes, data is collected about the parts during the kitting stage, but data may or may not be collected in the assembly stage based on the information in the user-defined parameters. Data may be collected again at the assembly area for parts which a single scan in the kitting area is insufficient as indicated by the user-defined parameters. User-defined parameters may include environmental characteristics such as manufacturing plant and operator shift, product characteristics, and operation characteristics, among others. The user-defined parameters may also comprise granularity to a specific work cell. The user-defined parameters enables the mass installation and re-validation processes to be applied to simple, repetitive configurations, while disqualifying the mass installation and re-validation processes for the complex configurations through the product line characteristic. Thus, the product line characteristic may be used to reconcile simple build to plan environments and complex build to order environments efficiently within one assembly processing scheme.

The hybrid data collection and component installation scheme also retains the data collected and validated during the kitting process and uses this retained data to automatically re-validate (i.e., checking the validity of the part against the current engineering change specifications, the part serial number, quality control flags for the part, supplier/vendor holds, etc) the parts during mass installation in the assembly process. If the manufacturing facility does not implement a kitting stage but instead uses kits from a vendor/supplier who provides the kitted parts directly to the manufacturing line as disclosed in U.S. patent application entitled "PROGRESSIVE VENDOR DATA MANAGEMENT AND VERIFICATION IN A MULTI-NODE SUPPLY NETWORK", Ser. No. 11/876,487, filed Oct. 22, 2007, and U.S. patent application entitled "AUTO-CASCADING CLEAR TO BUILD ENGINE FOR MULTIPLE ENTERPRISE ORDER LEVEL PARTS MANAGEMENT", Ser. No. 11/961,594, filed Dec. 20, 2007, both of which are incorporated herein by reference, the hybrid data collection and component installation scheme may also utilize the data collected by the vendor/supplier about the parts in the provided kit in the re-validation process. In this situation, as the collected data from the kitting stage is retrieved from the kit supplier, and no further data collection is required at the manufacturing facility for the re-validation process. The hybrid data collection and component installation scheme may also incorporate the data collected by vendor/supplier into the data validation scheme automatically, even if the data collection process comprises multiple levels. In addition, the hybrid data collection and component installation scheme also allows for handling multiple kits for the same work unit in the supply chain that are received at the assembly are from different kitting areas.

The hybrid data collection and component installation scheme also provides flexibility by enabling operator selection of the part installation method to be performed, while at the same time enabling part validation to be performed at the different stages in the manufacturing process to ensure product quality regardless of each operator's assembly skill level. The hybrid data collection and component installation scheme performs a full validation of the parts for usability based on the data collected at the kitting stage, and performs a full validation of parts at the assembly stage to make sure those parts are correct when the parts are being installed. A kitted or assembled part is a valid and usable part if the part number scanned from the kitted or assembled part matches the part number of a part specified in the production order or is defined as a valid substitute for the part specified in the production order, and if part specifications such as engineering changes, quality control flags, supplier/vendor holds, etc. do not indicate that the part, for whatever reason, should not be used in the assembly process. For parts which a single scan in the kitting area is sufficient as indicated by the user-defined parameters, the hybrid data collection and component installation scheme skips the data collection process at the assembly area and instead re-validates the parts during installation in the product assembly using the data collected about the parts at the kitting area. For parts which a single scan in the kitting area is insufficient as indicated by the user-modeled parameters, the hybrid data collection and component installation scheme scans the parts for a second time at the assembly area and validates the parts using this newly collected data during installation in the product assembly. Thus, the hybrid data collection and component installation scheme automates the scanning process of parts at the assembly stage and collects data only for those parts that are not available for mass installation, while still facilitating a full validation of parts at both the kitting stage and the assembly stage. This re-validation is performed in the background without operator intervention unless a part has been setup for "special handling" or a part is considered to be non-conforming according to the validation process. This re-validation is particular useful in any multiple stage manufacturing process where validation or logging activity must take place at more than one process point, as well as when either the collected part data is no longer accessible in post-processing or the time required to collect the part data is too great for process efficiency and cost.

The hybrid data collection and component installation scheme also integrates conventional or manual assembly processes with automated mass installation assembly processes. The hybrid data collection and component installation scheme intermixes mass installation sets of parts within the typical assembly operations, thereby running both conventional assembly processes and automated mass installation assembly processes on different portions of the same order, parts, or operation. The hybrid data collection and component installation scheme may be setup to include any degree of intermixed operations to co-exists, including an all-unit build in which the sets of parts for mass install comprises an empty set, an all-sequential/mass build in which the sets of parts for mass install comprises all parts with no parts requiring special handling, or an intermixed build in which some parts require special handling, while the remaining set of parts are qualified for the mass installation process according to the user-defined parameters. The intermixed operations may also apply to units of work within a complex configured order, thereby allowing sequential/mass activity on simple nodes/blades/boards while requiring unit build on the complex racks of the system.

The mechanism of the illustrative embodiments provides an advantage over the existing data collection solutions by providing a solution which optimizes equipment cost, cycle time (throughput) or product quality practices. The solution provided by the illustrative embodiments requires only minimal data collection equipment in the assembly area thereby minimizing equipment costs. The solution provided by the illustrative embodiments enables fast cycle time and throughput by reducing the amount of data required to be collected at the assembly area. The solution provided by the illustrative embodiments also provides a high level of engineering change containment and quality containment by validating the parts used at all stages in the manufacturing process.

In one embodiment, the mass installation assembly option is implemented as one-button user interface in a workstation. The workstation displays a window to an operator who uses the window to scan and log data about parts in an assembly process and to determine the locations in which to install the parts into the assembly. If parts in a product are available for mass installation, a one-button screen option may be provided to the operation to allow the operator to select either the automatic mass installation assembly process or the conventional manual assembly process. The one-button selection option allows for re-validating the data collected in the kitting process prior to the performing the assembly process. This option provides flexibility in that the operator is allowed to choose whether or not parts that qualify for mass installation will actually be mass installed. The operator may elect to install the parts traditionally, such as when the operator is inexperienced and chooses run through all of the manual assembly screens a number of times first before attempting the mass install process. Upon completion of the mass installation assembly process, the workstation will display an assembly screen for the remaining parts in the product which were not available for mass installation to be installed.

Figure 3:
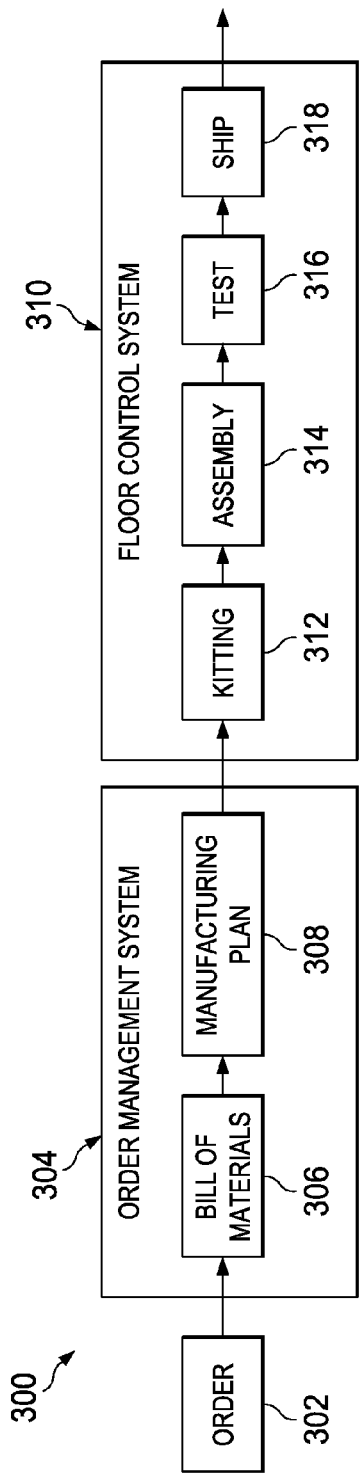
FIG. 3 is a block diagram illustrating an exemplary manufacturing system in which the illustrative embodiments may be implemented.

FIG. 3 is a block diagram illustrating an exemplary manufacturing system in which the illustrative embodiments may be implemented. An order 302 is generated from an order source, such as from a customer or a web-based ordering system. Orders received from order sources are entered into order management system 304, which can be implemented in a server, such as server 104 in FIG. 1. Order management system 304 is responsible for managing the processes for order entry, order change, order translation, order history management, and converting customer orders to manufacturing orders. Order management system 304 sends orders to the manufacturing facility to be built for the current configuration, schedule, and customer.

Order management system 304 identifies the delivery date and engineering change effective dates for the parts required for producing the ordered product. Once engineering change effective dates for components are identified, order management system 304 generates bill of materials 306 for the components. Order management system 304 uses bill of materials 306 to generate manufacturing plan 308, taking into account manufacturing requirements such as availability of inventory, tooling, and personnel. Floor control system 310 executes pre-kitting and kitting processes 312 based on manufacturing plan 308 to collect and organize the parts needed to build the product into kits. When the kitted parts are received at the assembly area, floor control system 310 executes assembly processes 314 to build the ordered product from the parts in the kit. The assembled products are then undergo test processes 316 and are made ready to be shipped 318 to the requesting client.

Figure 4:
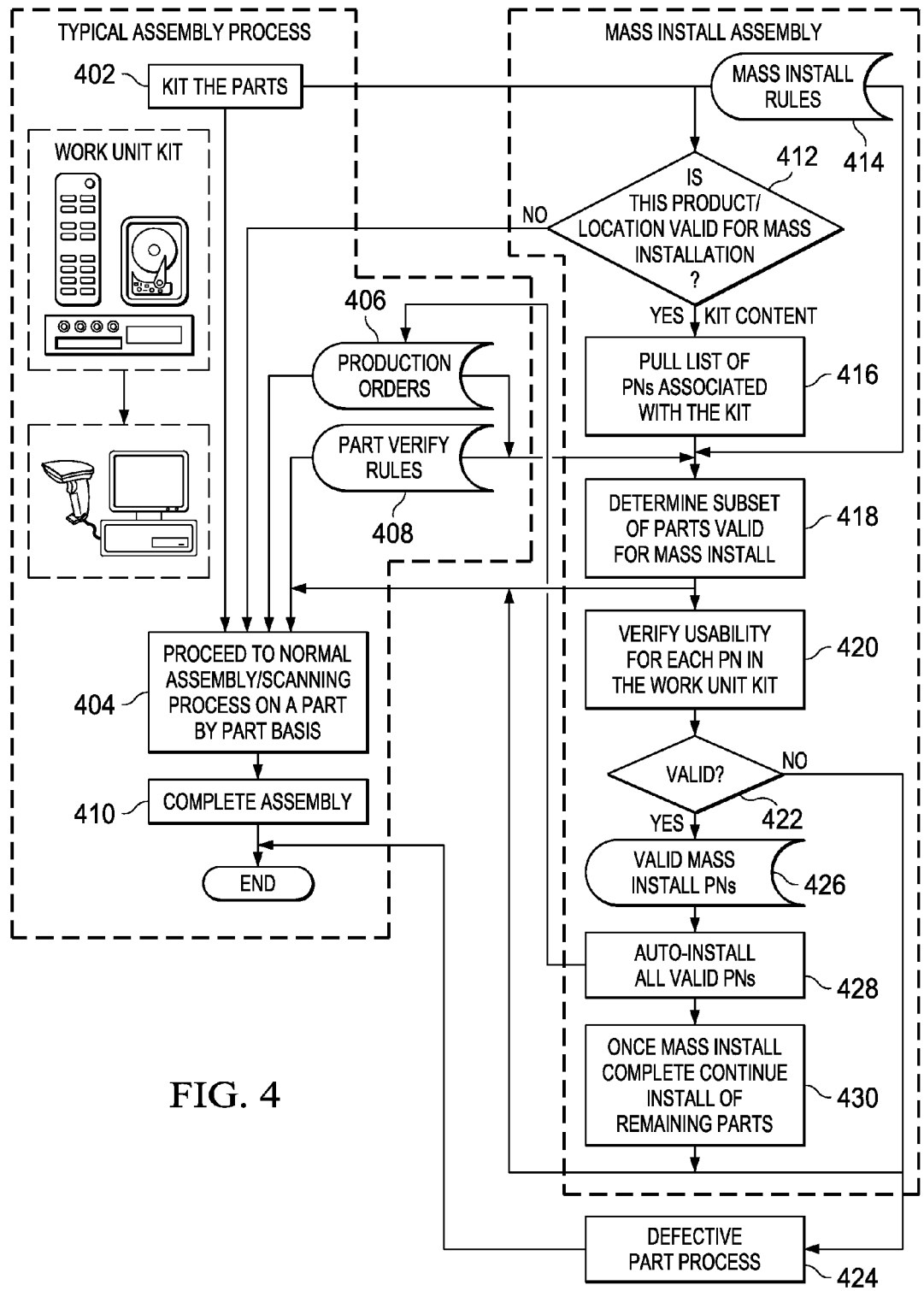
FIG. 4 is a flowchart of a process in a hybrid data collection and item installation scheme that adjusts the required data collection activity to optimize equipment costs, throughput, and quality practices in a multi-step processing environment in accordance with the illustrative embodiments.

FIG. 4 is a flowchart of a process in a hybrid data collection and item installation scheme that adjusts the required data collection activity to optimize equipment costs, throughput, and quality practices in a multi-stage processing environment in accordance with the illustrative embodiments. The process described in FIG. 4 may be implemented in any multi-stage manufacturing process, such as kitting-assembly processes 312 and 314 in FIG. 3. Blocks 402-410 represent conventional assembly processes, while blocks 412-430 represent the mass installation assembly process in accordance with the illustrative embodiments. While only a single operation is depicted in the mass install process in FIG. 4, the mass installation assembly process may be implemented for any number of product assembly operations.

The process begins in the kitting area where parts corresponding to a requested order are collected and kitted by placing the parts into a tote or bin (block 402). As part of the kitting process, when the parts are placed into the tote or bin, the operator scans the parts to perform full data collection for the parts. The kitting floor system verifies that the data collected in the kitting process reflects that the parts being kitted are valid and usable, that there are no any quality holds (serial number blocks) on the kitted parts, and that the kitted parts are indeed at the correct/most current engineering change level. Thus, the kitting process verifies that the parts are allowed to be kitted.

At this point in the conventional assembly process, the process proceeds to perform the normal assembly and scanning process on a part by part basis (step block 404). In the conventional assembly process, parts are scanned on an individual basis as each part is installed in the product. In other words, full data collection is again performed for each part being installed. Inputs to block 404 comprise production order data set (block 406) and part verification rules data set (block 408). Information in the production order data set is used by the conventional assembly process to determine if the parts for installation reflected in the collected data match the parts specified in the production order. Part verification rules are also used by the conventional assembly process to verify that the data collected in the assembly process reflects that the parts being assembled are still currently valid and usable. A part may be valid and usable if the current engineering change specifications, part serial number, quality control flags for the part, supplier/vendor holds, etc., indicate that the part may be used in the assembly process. After the parts are verified, the conventional assembly process completes the installation of the parts into the product (block 410), with the process terminating thereafter.

Turning back to block 402 where the parts are kitted and scanned, a determination is made as part of the mass installation process as to whether the particular product being assembled qualifies for mass installation (block 412). Mass installation rules (block 414) define the types or characteristics of products that qualify for the current mass installation process. In one embodiment, mass installation rules provide further granularity by specifying particular locations or environmental characteristics in which the mass installation process may be applied to a qualified product. An example of a mass installation rules table is illustrated in FIG. 5, and an example of a mass installation rules special handling table is illustrated in FIG. 6.

If the mass installation rules indicate that the particular product being assembled does not qualify for mass installation ('no' output of block 412), the process continues to block 404 to perform the conventional or manual assembly process on an individual (part by part) basis. However, if the mass installation rules indicate that the particular product being assembled qualifies for mass installation ('yes' output of block 412), the kitted parts and the data collected during the kitting process are provided to the assembly area. Thus, in contrast with existing assembly processes which only allow the data collection/scanning process to either be turned on or off (i.e., data is only either collected for all parts in a product assembly or not collected for any parts in the product assembly), the mass installation assembly process adjusts the data collection within a product to allow for collecting data based on the requirements of each part being installed.

Upon obtaining the kitted part and the kitted data content from the kitting area, the mass installation assembly floor control application pulls the list of part numbers that are associated with the kit from the production order and tables saved against the production order containing the data collected from the kitted parts (block 416). The mass installation assembly floor control application then determines a subset of parts in the list of parts that are valid for mass installation (block 418). Inputs to the determination in block 418 comprise production order data set (block 406), part verification rules data set (block 408), and mass installation rules data set (block 414). This determination of which subset of parts may be valid for mass installation is performed as there are some classes of parts which require a scan-installation process, a typical example being a part tracked by unique serial number that is to be installed in a specific location on a machine, and of which more than one identical part will be installed in multiple locations. In this case, it is imperative to scan the part serial numbers upon installation, such that the floor control record for that part will be in concurrence with the actual installed part-serial number. Information in the production order is used by the mass installation process to determine if the parts for installation reflected in the list of parts match the parts specified in the production order. The mass installation rules data set (e.g., tables defined in FIGS. 5 and 6) is used by the mass installation process to identify the subset of parts in the parts list that is qualified for mass installation. The mass installation rules data set may comprise rules that specify which parts qualify for mass installation and which parts are expressly disqualified for mass installation and require special handling.

For parts that are determined to be invalid for mass installation, the process continues to block 404 to allow these parts to be assembled according to the conventional assembly process in which the parts are individually handled with other non-kitted parts. For those parts that are determined to be valid for mass installation, part verification rules are used by the mass installation process to verify that the data collected in the kitting stage reflects that the parts being assembled are still currently valid and usable (block 420). This verification comprises the second verification, or re-verification, of the usability of the kitted parts using the kitted data. If the part number corresponds to a parent part, the process recursively verifies all collected data for the parent part until all nested parts have been verified.

A determination is then made as to whether each part in the part subset is valid based on the second verification (block 422). If a part not valid ('no' output of block 422), the mass installation process continues to block 404 for the valid parts to be individually assembled according to the conventional assembly process and also continues to defective part process (block 424) to determine if the defective part is due to invalid content within the part number/serial number assembly. However, if the part is valid ('yes' output of block 422), the mass installation process obtains the part numbers for the valid subset (block 426), and then automatically installs all of the valid part numbers for the subset (block 428). Auto-installation of parts in this context comprises the automatic 'logging' of the parts as installed, inheriting previously collected data to the current active part records, as well as re-validating the data according to the part verification rules. In another embodiment, auto-installation may also include the subsequent trigger of an automated physical installation process in certain types of manufacturing processes. The production order data set in block 406 is also updated to reflect that the mass installation of these valid part numbers has been performed.

When the mass installation process is complete, the installation of any remaining parts not available for mass installation is continued (block 430), and the process returns to block 404 to perform the conventional assembly process on these remaining parts on a one-by-one basis with full data collection.

FIGS. 5 and 6 illustrate exemplary mass installation rules tables which are used by the assembly floor control application to determine if the mass installation assembly process and automatic validation may be implemented on the product being assembled. The mass installation rules tables in FIGS. 5 and 6 are represented by mass installation rules 414 in FIG. 4. The assembly floor control application uses the mass installation rules table in FIG. 5 to determine if the product in question qualifies for the mass installation assembly process. If the assembly floor control application determines that a product qualifies for mass installation, the assembly floor control application checks the mass installation rules special handling table in FIG. 6 to determine if the product being assembled is expressly invalidated for mass installation. An otherwise qualified product may be invalidated for mass installation as indicated in the mass installation rules special handling table if full data collection should be performed during assembly to ensure that these special parts are installed into the correct locations in the product assembly. While the particular embodiments of the mass installation rules tables in FIGS. 5 and 6 define which parts require special handling and assume that all other qualified parts are available for mass installation, the mass installation rules tables may alternatively be implemented to define the parts in the special handling table that do not require special handling.

Mass installation rules table 500 may comprise various product and environmental parameters which define and limit the products that are available for the mass installation assembly process and the locations in which the mass installation assembly process may be run. For example, product parameters specified in mass installation rules table 500 may include, but are not limited to, the product machine type, product model, particular assembly operation, product line, etc. Examples of environmental parameters include, but are not limited to, the manufacturing plant, the manufacturing plant area, the operator shift, etc. The mass installation process may be limited to specific environmental conditions such as operator shift, since not all operators may have the skill or knowledge to perform the mass installation process.

As shown in FIG. 5, a record in mass installation rules table 500 may comprise plant 502, shift 504, product machine type 506, product model 508, product line 510, workcell 512, and operation 514. Plant 502 and operator shift 504 specify the specific environmental conditions/location in which the mass installation assembly process may be performed. Product machine type 506, product model 508, and product line 510 indicate the product type, model number, and line of products available for mass installation. Workcell 512 indicates the particular assembly workcell or type of workcell in which the mass installation assembly process may be performed. Operation 514 indicates the type of assembly operation in which the mass installation assembly process may be performed.

In this illustrative example, record 516 of mass installation rules table 500 specifies that the mass installation assembly process may be performed by the assembly floor control system if operation 0050 is being performed on machine type 9406, model 570, and product line MLX at the Dublin plant on the 1$^{st}$ shift. Record 518 of mass installation rules table 500 specifies that the mass installation assembly process may be performed by the assembly floor control system if operation 0050 is being performed on any machine type, model, and product line at the China plant on the 1$^{st}$ or 2$^{nd}$ shifts. Record 520 of mass installation rules table 500 specifies that the mass installation assembly process may be performed by the assembly floor control system at any location and on any product if operation 0030 is being performed. It should be noted that although specific parameters are shown in mass installation rules table 500, any other product or environmental parameters or combinations of parameters may be used to limit the mass installation assembly process as desired.

FIG. 6 illustrates an exemplary special handling table indicating parts excluded from the mass installation processes. Special handling table 600 is an exclusionary table referenced by the assembly floor control application to determine if a product that qualifies for the mass installation assembly process based on the content of the mass installation rules table in FIG. 5 should still be excluded from the mass installation process due to special handling concerns. For instance, these special handling concerns may require data to be collected (i.e., the part to be scanned) during the assembly process to provide a record of the specific location in which a part is installed into the product assembly. The table excludes certain types of parts in the product from being automatically installed as part of the mass install process.

As shown in FIG. 6, a record in special handling table 600 may specify the bill of materials 602, part number 604, commodity code 606, operation 608, placement indicators 610, asset class 612, and description 614. Bill of materials 602, part number 604, and commodity code 606 specify attributes about individual parts that require special handling. Operation 608 indicates the types of assembly operations performed on the part numbers that should be excluded from the mass installation assembly process. Placement indicators 610 are numeric sets used to identify a specific location within the product assembly that the part is going be installed. Asset class 612 indicates whether a part belongs to a particular asset group.

In this illustrative example, record 616 of special handling table 600 indicates that for all bills of materials and part numbers, any hard drive (DASD) that is assembled in operation 0050 into any hard drive slot named "DS0"+% (any value) is disqualified for mass installation, and thus will be scanned by the operator in the conventional assembly process to enable the exact location of where the specific hard drive was actually installed in the assembly to be logged. Thus, rather that automatically installing these parts defined in the special handling table, the operator must scan the specific serial number of the hard drive and match this serial number to the location of the assembly in which the operator will install the hard drive. Record 618 of special handling table 600 indicates that a particular part is required to be specially handled in all situations since the part contains tricky installation procedures. Record 620 of special handling table 600 indicates that any parts in the asset class APC5 are considered to be sensitive or highly confidential, and thus should be handled in a manner to ensure that the part is actually installed in the location the part is supposed to be installed. Consequently, record 620 invalidates these APC5 parts from participating in the automatic mass installation assembly process.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing assembly of parts in a multiple stage manufacturing environment, the computer implemented method comprising:
  receiving, from a stage in the multiple stage manufacturing environment, a kit comprising a plurality of parts corresponding to an order for a product, wherein the plurality of parts were validated in the stage using data collected about the plurality of parts in the stage;
  determining, at a subsequent stage in the multiple stage manufacturing environment, if the product qualifies for mass installation;
  responsive to a determination that the product qualifies for mass installation, selecting a set of parts in the kit corresponding to the product for mass installation;
  re-verifying the set of parts using the data collected in the stage in the multiple stage manufacturing environment to determine if the set of parts selected for mass installation is valid; and
  responsive to a determination that the set of parts is valid for mass installation, installing the set of parts en masse.

2. The computer implemented method of claim 1, further comprising:
  responsive to a determination that one or more parts in the order for the product do not qualify for mass installation, collecting data about the one or more parts in the subsequent stage;
  verifying the one or more parts using the data collected in the subsequent stage to determine if the one or more parts are valid for installation; and
  responsive to a determination that the one or more parts are valid for installation, installing the one or more parts on a part by part basis.

3. The computer implemented method of claim 2, further comprising:
  responsive to a determination that the set of parts is valid for mass installation, providing an interface to an operator, wherein the interface informs the operator that the set of parts is valid for mass installation;
  responsive to selection, by the operator, of a first option on the interface, installing the set of parts en masse; and
  responsive to selection, by the operator, of a second option on the interface, collecting data about the set of parts, verifying that the set of parts is valid for installation using the collected data, and installing the set of parts on a part by part basis if the set of parts are valid for installation.

4. The computer implemented method of claim 1, wherein the stage and the subsequent stage in the multiple stage manufacturing environment are implemented in a same manufacturing facility.

5. The computer implemented method of claim 1, wherein the stage and the subsequent stage in the multiple stage manufacturing environment are implemented in different manufacturing facilities.

6. The computer implemented method of claim 1, wherein the data collected in the stage is collected by a vendor or supplier of the kit comprising the plurality of parts corresponding to the production order.

7. The computer implemented method of claim 1, wherein determining if the product qualifies for mass installation further comprises:
  comparing characteristics of the product and the manufacturing environment against a set of mass installation rules defined in a table; and
  responsive to the characteristics of the product and the manufacturing environment matching the set of mass installation rules in the table, determining that the product qualifies for mass installation.

8. The computer implemented method of claim 7, wherein the characteristics of the manufacturing environment include at least one of manufacturing plant, plant area, operator shift, or manufacturing workcell.

9. A data processing system for managing assembly of parts in a multiple stage manufacturing environment, the data processing system comprising:
  a bus;
  a storage device connected to the bus, wherein the storage device contains computer usable code;
  at least one managed device connected to the bus;
  a communications unit connected to the bus; and
  a processing unit connected to the bus, wherein the processing unit executes the computer usable code to receive, from a stage in the multiple stage manufacturing environment, a kit comprising a plurality of parts corresponding to an order for a product, wherein the plurality of parts were validated in the stage using data collected about the plurality of parts in the stage; determine, at a subsequent stage in the multiple stage manufacturing environment, if the product qualifies for mass installation; select a set of parts in the kit corresponding to the product for mass installation in response to a determination that the product qualifies for mass installation; re-verify the set of parts using the data collected in the stage in the multiple stage manufacturing environment to determine if the set of parts selected for mass installation is valid; and install the set of parts en masse in response to a determination that the set of parts is valid for mass installation.

10. The data processing system of claim 9, wherein the processing unit further executes the computer usable code to collect, in response to a determination that one or more parts in the order for the product do not qualify for mass installation, data about the one or more parts in the subsequent stage; verify the one or more parts using the data collected in the subsequent stage to determine if the one or more parts are valid for installation; and install the one or more parts on a part by part basis in response to a determination that the one or more parts are valid for installation.

11. The data processing system of claim 10, wherein the processing unit further executes the computer usable code to provide, in response to a determination that the set of parts is valid for mass installation, an interface to an operator, wherein the interface informs the operator that the set of parts is valid for mass installation; install the set of parts en masse in response to selection, by the operator, of a first option on the interface; and collect data about the set of parts, verify that the set of parts is valid for installation using the collected data, and install the set of parts on a part by part basis if the set of parts are valid for installation in response to selection, by the operator, of a second option on the interface.

12. The data processing system of claim 9, wherein the computer usable code to determine if the product qualifies for mass installation further comprises computer usable code to compare characteristics of the product and the manufacturing environment against a set of mass installation rules defined in a table, wherein the characteristics of the manufacturing environment include at least one of manufacturing plant, plant area, operator shift, or manufacturing workcell; and responsive to the characteristics of the product and the manufacturing environment matching the set of mass installation rules in the table, determine that the product qualifies for mass installation.

13. A computer program product for managing assembly of parts in a multiple stage manufacturing environment, the computer program product comprising:

a computer usable medium having computer usable program code tangibly embodied thereon, the computer usable program code comprising:

computer usable program code for receiving, from a stage in the multiple stage manufacturing environment, a kit comprising a plurality of parts corresponding to an order for a product, wherein the plurality of parts were validated in the stage using data collected about the plurality of parts in the stage;

computer usable program code for determining, at a subsequent stage in the multiple stage manufacturing environment, if the product qualifies for mass installation;

computer usable program code for selecting a set of parts in the kit corresponding to the product for mass installation in response to a determination that the product qualifies for mass installation;

computer usable program code for re-verifying the set of parts using the data collected in the stage in the multiple stage manufacturing environment to determine if the set of parts selected for mass installation is valid; and computer usable program code for installing the set of parts en masse in response to a determination that the set of parts is valid.

14. The computer program product of claim 13, further comprising:

computer usable program code for collecting, in response to a determination that one or more parts in the order for the product do not qualify for mass installation, data about the one or more parts in the subsequent stage;

computer usable program code for verifying the one or more parts using the data collected in the subsequent stage to determine if the one or more parts are valid for installation; and computer usable program code for installing the one or more parts on a part by part basis in response to a determination that the one or more parts are valid for installation.

15. The computer program product of claim 14, further comprising:

computer usable program code for providing, in response to a determination that the set of parts is valid for mass installation, a user interface to an operator, wherein the user interface informs the operator that the set of parts is valid for mass installation;

computer usable program code for installing the set of parts en masse in response to selection, by the operator, of a first option on the user interface; and computer usable program code for collecting data about the set of parts, verifying that the set of parts is valid using the collected data, and installing the set of parts on a part by part basis if the set of parts are valid in response to selection, by the operator, of a second option on the user interface.

16. The computer program product of claim 13, wherein the stage and the subsequent stage in the multiple stage manufacturing environment are implemented in a same manufacturing facility.

17. The computer program product of claim 13, wherein the stage and the subsequent stage in the multiple stage manufacturing environment are implemented in different manufacturing facilities.

18. The computer program product of claim 13, wherein the data collected in the stage is collected by a vendor or supplier of the kit comprising the plurality of parts corresponding to the production order.

19. The computer program product of claim 13, wherein the computer usable program code for determining if the product qualifies for mass installation further comprises:

computer usable program code for comparing characteristics of the product and the manufacturing environment against a set of mass installation rules defined in a table; and computer usable program code for determining, in response to the characteristics of the product and the manufacturing environment matching the set of mass installation rules in the table, that the product qualifies for mass installation.

20. The computer program product of claim 19, wherein the characteristics of the manufacturing environment include at least one of manufacturing plant, plant area, operator shift, or manufacturing workcell.

* * * * *